(12) United States Patent
Vontell et al.

(10) Patent No.: US 7,658,217 B2
(45) Date of Patent: Feb. 9, 2010

(54) HIGH TEMPERATURE LAMINATION TOOL

(75) Inventors: John H. Vontell, Manchester, CT (US); George A. Salisbury, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 336 days.

(21) Appl. No.: 11/646,732

(22) Filed: Dec. 28, 2006

(65) Prior Publication Data

US 2008/0156422 A1    Jul. 3, 2008

(51) Int. Cl.
C09J 5/00        (2006.01)
B29C 65/00       (2006.01)
B27D 3/00        (2006.01)
D21F 5/00        (2006.01)
F26B 13/00       (2006.01)

(52) U.S. Cl. .................. 156/382; 156/286; 156/312; 100/316

(58) Field of Classification Search .............. 156/228, 156/285, 286, 312, 381, 382, 497, 580, 581, 156/583.1, 583.6, 583.7; 100/35, 38, 240, 100/264, 305, 308, 315, 316, 317, 318, 319, 100/320, 324, 325, 326, 328
See application file for complete search history.

(56) References Cited

U.S. PATENT DOCUMENTS

| 2,908,319 | A | * | 10/1959 | Robar ....................... 269/234 |
| 3,125,331 | A |   | 3/1964  | Gerhart |
| 3,960,635 | A | * | 6/1976  | La Roy et al. ............... 156/286 |
| 4,290,838 | A | * | 9/1981  | Reavill et al. ............... 156/286 |
| 4,596,624 | A | * | 6/1986  | Frohlich et al. ............. 156/382 |
| 4,824,509 | A | * | 4/1989  | Tonoki et al. ............... 156/285 |
| 4,908,087 | A | * | 3/1990  | Murooka et al. ............. 156/286 |
| 5,262,227 | A | * | 11/1993 | Takabayashi et al. ....... 428/215 |
| 5,468,315 | A | * | 11/1995 | Okada et al. .................. 156/64 |
| 5,496,433 | A | * | 3/1996  | Miyashita et al. ........... 156/358 |
| 5,769,998 | A | * | 6/1998  | Tanzawa et al. ............. 156/285 |
| 6,041,840 | A | * | 3/2000  | Ogawa ....................... 156/382 |

FOREIGN PATENT DOCUMENTS

DE    4232610         3/1994
JP    59206200 A  *  11/1984

OTHER PUBLICATIONS

Partial European Search Report dated Apr. 18, 2008.

* cited by examiner

*Primary Examiner*—Richard Crispino
*Assistant Examiner*—Brian R Slawski
(74) *Attorney, Agent, or Firm*—Carlson, Gaskey & Olds

(57) ABSTRACT

A tool for laminating a metal foil and polymer film to form a laminate structure is disclosed. A method of using the tool to form a laminate structure is also disclosed.

25 Claims, 4 Drawing Sheets

HIGH TEMPERATURE LAMINATION TOOL

STATEMENT REGARDING FEDERALLY SPONSORED RESEARCH OR DEVELOPMENT

This invention was made with Government support awarded by the Joint Program Office of the United States Department of Defense, contract number N00019-02-C-3003. The United States Government has certain rights in this invention.

BACKGROUND OF THE INVENTION

1. Field of Invention

The present disclosure is generally related to a tool for lamination of a metal foil and a polymer film at high temperatures, and methods of manufacturing and using the tool.

2. Description of the Related Art

Thin thermoplastic polyimide film and metal foil structural composite heaters have widespread use in aerospace applications, such as with/in propellers, helicopter rotors, nose cones, spinners, stators, gas turbine inlet ducts, nacelles and wings. For operation above 300° F., the heater assemblies are processed at temperatures greater than 600° F., using pressures exceeding 200 pounds per square inch (psi) under vacuum.

This type of heater is typically processed using an autoclave or Vacuum Hydraulic Press (VHP) to apply heat, pressure, and vacuum. Each of these methods has advantages and disadvantages.

Autoclave processing has the advantage that gas pressure can be used to uniformly apply hydrostatic pressure to the surfaces of the lamination stack, and that multiple lamination structures can be processed simultaneously. The disadvantages are that autoclave processing is commonly limited to a maximum pressure of 200 psi at 600° F., resulting in slow throughput rates due to equipment limitations. In addition, autoclave processing uses polymer bags and/or seals that can fail at the high processing temperatures required for lamination, resulting in leaks that cause loss of applied pressure and may cause loss of the lamination part being fabricated. Autoclave equipment is expensive and labor-intensive, as are the polymer bags and sealants used, and can be a safety hazard at the high pressures (greater than 200 psi) and high temperatures (greater than 600° F.) for lamination. Autoclaves also have long cycle times because the high thermal mass of the autoclave results in low heating rates. Likewise, pressure application rates are slow due to the high gas volumes required, which may be greater than 10 minutes to reach 200 psi.

Vacuum Hydraulic Press (VHP) processing has the advantages that high temperatures are easily achieved (greater than 1000° F.), as are high pressures (greater than 3000 psi). VHP provides rapid pressure application and high heating rates. VHP does not require expendable polymer sealants. Multiple platens and low thermal mass allow faster cycle times and multiple part throughput. In addition, VHP has a smaller "footprint" than an autoclave, and substantially lower operating costs. Thus, VHP permits overall part flow that is several times faster than with autoclave processing. However, VHP has disadvantages in that non-uniform pressure application can result when processing thin films due to compression tooling mismatch. Also, a fluid thermoplastic layer such as PFA (perfluoroalkoxy film) is required to distribute pressure. In addition, tool/platen distortion resulting from non-uniform loading within the tool can contribute to problems with lamination quality.

SUMMARY OF THE INVENTION

The present disclosure provides a tool that laminates a metal foil and a polymer to form a laminate structure.

The present disclosure further provides such a tool that laminates one or more metal foils and polymers by using the high temperatures and high pressures available with VHP processing as well as applying gas pressures to the surface of the lamination stack that is available with autoclave processing.

The present disclosure still further provides such a tool that is used for the fabrication of electro-thermal heaters for anti-ice/de-icing applications in gas turbine engines. The tool optionally further comprises a contraction isolator, which reduces or eliminates wrinkling, crumbling or buckling of the laminate structure as it cools.

The present disclosure also provides such a tool that reduces the volumes of pressurized gas needed for operation of this tool as compared with an autoclave, so that the tool has economic and environmental benefits.

DETAILED DESCRIPTION OF THE INVENTION

Figure 1:
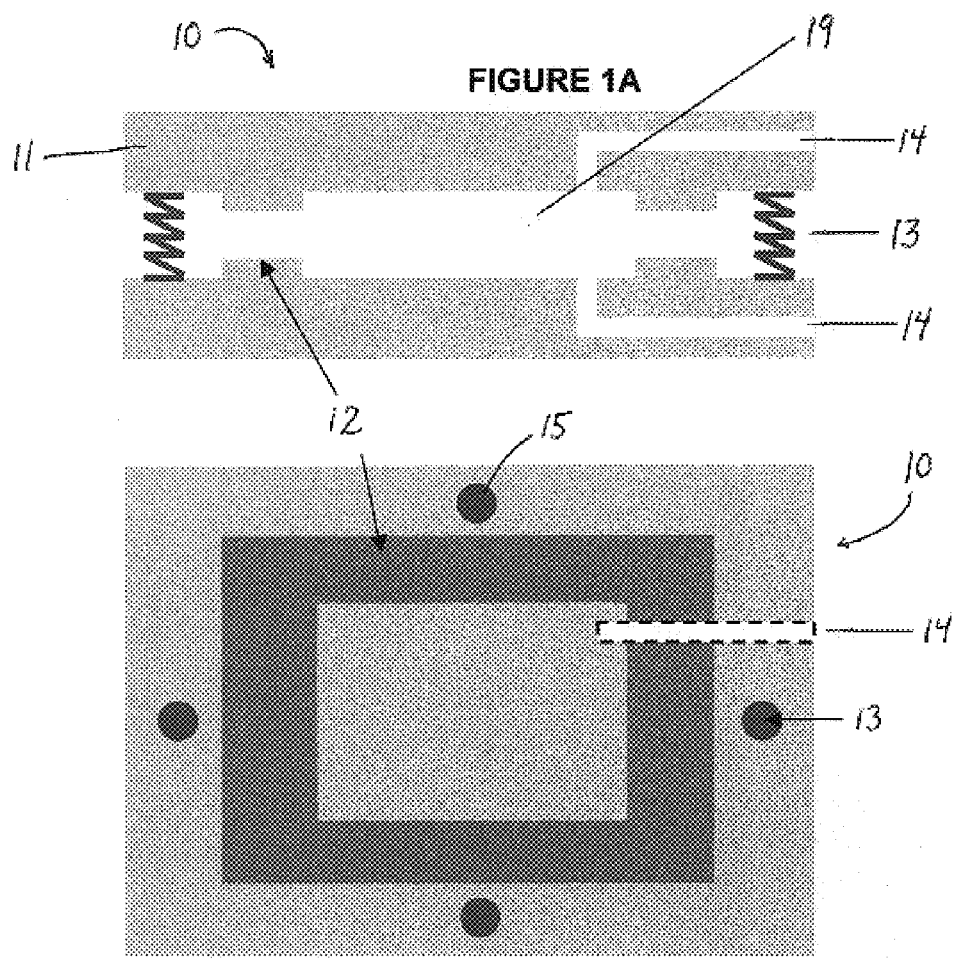
FIG. 1A is a cross section and FIG. 1B is a top view of the tool, shown in open configuration.
Figure 2:
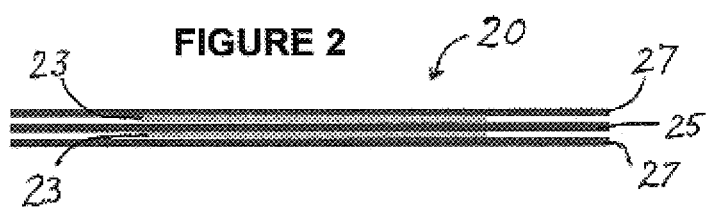
FIG. 2 is a schematic of the lamination stack and contraction isolator used to form the laminate structure.

Referring to the drawings and, in particular, FIGS. 1A, 1B and 2, there is provided a tool according to the present disclosure generally represented by reference numeral 10. The tool 10 laminates a metal foil 23 and polymer or polymer film 25 to form a laminate structure (laminate film) 20 shown in FIG. 2. The laminate structure 20 is used in the fabrication of electro-thermal heaters for anti-ice/de-icing applications in gas turbine engines.

Referring to FIG. 2, laminate structure 20 is illustrated with two metal foils 23, each positioned adjacent a different side of a polymer film 25. Optionally, a pair of contraction isolators 27 are positioned one adjacent to each metal foil 23. The contraction isolators 27 may be used to reduce or eliminate wrinkling, crumbling or buckling of the laminate structure during the cooling phase.

Referring to FIGS. 1A and 1B, tool 10 has a pair of platens 11. Each platen 11 has a sealing surface 12. The sealing surfaces 12 preferably have a flat face. However, each sealing surface 12 can have a non-flat surface. The pair of platens 11 and sealing surfaces 12 form a cavity 19. Although two platens 11 are illustrated, tool 10 may have more than two platens. In one embodiment, tool 10 also has two or more springs 13, which are positioned at or towards the ends of the pair of platens 11 to keep the pair of platens separated when no pressure is applied, and to return the platens to the open position once pressure is released. In one embodiment, the springs 13 are positioned outside cavity 19 adjacent but not contacting the structure for sealing surface 12. As shown in FIG. 1B, four springs can be used which would include pair of springs 13 and pair of springs 15. The springs 13 (and springs 15) are sized to keep the tool 10 in an open configuration when under minimal pressure loads. The springs 13, 15 take the weight of the platens 11 when it is in an open configuration, but are not necessary for the tool 10 to operate. The springs 13, 15 are preferably Belleville springs.

In each platen 11, there is a channel or inlet pressure opening 14 for permitting a medium, preferably a gas, to enter into the cavity 19. However, more than one inlet pressure opening 14 can be used for each platen 11 in another embodiment.

The tool 10 has a body that is made of any material able to withstand repeated application of high temperatures and high pressures needed for lamination. For example, the material would have to be able to withstand temperatures greater than 600° F., and pressures greater than 200 pounds per square inch (psi), and even greater than about 1000 psi. A metal or metal alloy that does not readily oxidize could be used as the material to make the tool. However, the body of tool 10 could, instead, be made of ceramic or any material capable of operating at high temperatures and high pressures. Preferably, the body of tool 10 is made of stainless steel.

Before tool 10, and thus platens 11, are actuated, the lamination structure 20 (optionally including contraction isolators 27) is placed in the open cavity 19. When pressure is applied by the vacuum hydraulic press, the pair of platens 11 move toward each other to close the cavity 19 between the sealing surfaces 12. When sufficient pressure is applied, the cavity 19 becomes completely closed and sealed, and the cavity itself is pressurized, the tool 10 opens and closes to allow evacuation of the air and volatiles from the lamination stack 20 using a vacuum greater than 28 inches of mercury. The VHP can be used as a source for vacuum, heat, and/or pressure required for evacuation and heating of the lamination stack 20 and actuation of the platens 11.

An embodiment of the present disclosure uses one or more contraction isolators 27. The contraction isolator 27 isolates the lamination structure 20 from the tooling edges (sealing surfaces 12) to minimize or prevent distortion of the laminate structure, particularly during the cooling phase. Distortion of the laminate structure 20 is due to the higher thermal contraction of the tooling metal (such as stainless steel) relative to the thermal contraction of the metal foil (such as titanium) used to make the laminate structure. Although contraction isolators 27 are not required for the operation of the present disclosure, their use reduces wrinkling, crumbling, and/or buckling of the laminate structure. In addition, the contraction isolator provides additional structural support to the laminate structure 20 as the laminate structure is removed from the tool 10, which makes the product easier to handle. The contraction isolators 27 can then be removed from the laminate structure 20, and either disposed or recycled.

Some characteristics of contraction isolators 27 that are used in the present disclosure are that contraction isolators have coefficients of thermal expansion (CTE) that are equal to or greater than the CTE of the tool material. Contraction isolators 27 may not be required when the CTE of the tool material is equal to or less than the CTE of the metal foil 23 used in the laminate structure 20. In addition, contraction isolators 27 also provide the benefit of a slip plane interface, so that the laminate structure 20 may be removed more easily and cleanly from the tool 10 after manufacture. Although the embodiment of a lamination structure 20 illustrated in FIG. 1 is shown as having two contraction isolators 27, there may also be a single, or more than three, contraction isolators for each lamination structure 20. Each contraction isolator 27 may, itself, be a single layer or may be more than two layers.

As discussed above, the lamination structure 20 may be any combination of one or more metal foils 23 and one or more polymer films 25, as well as, if desired, one or more contraction isolators 27. The polymer film 25 used in the lamination structure 20 may be any heterogeneous or homogeneous polymer film that sufficiently adheres to a metal foil. Each metal foil 23 is preferably thin. Likewise, each polymer or polymer film 25 is also preferably thin.

An example of a metal foil 23 would be titanium foil. Other examples of metal foils for the present disclosure include titanium alloys, copper, copper alloys, nickel, nickel alloys, stainless steel or another electrically-resistive metal alloy. The thickness of the metal foil can range from about 0.0005 inches to about 0.010 inches, and is typically of a thickness of about 0.001 inches.

The polymer film 25 can be a non-porous thermoplastic polymer, such as a polyimide. The thickness of the polymer film can range from about 0.0005 inches to about 0.050 inches in thickness, and is typically of a thickness of about 0.002 inches.

Closing the tool 10 by actuation compacts the laminate edges, creating a seal at the edges of the laminate structure 20. The amount of pressure required to move the pair of platens 11 towards each other so that the sealing surfaces 12 seal the edges of the laminate structure 20, and thus enclose cavity 19, is defined as the sealing pressure (SP).

Figure 4:
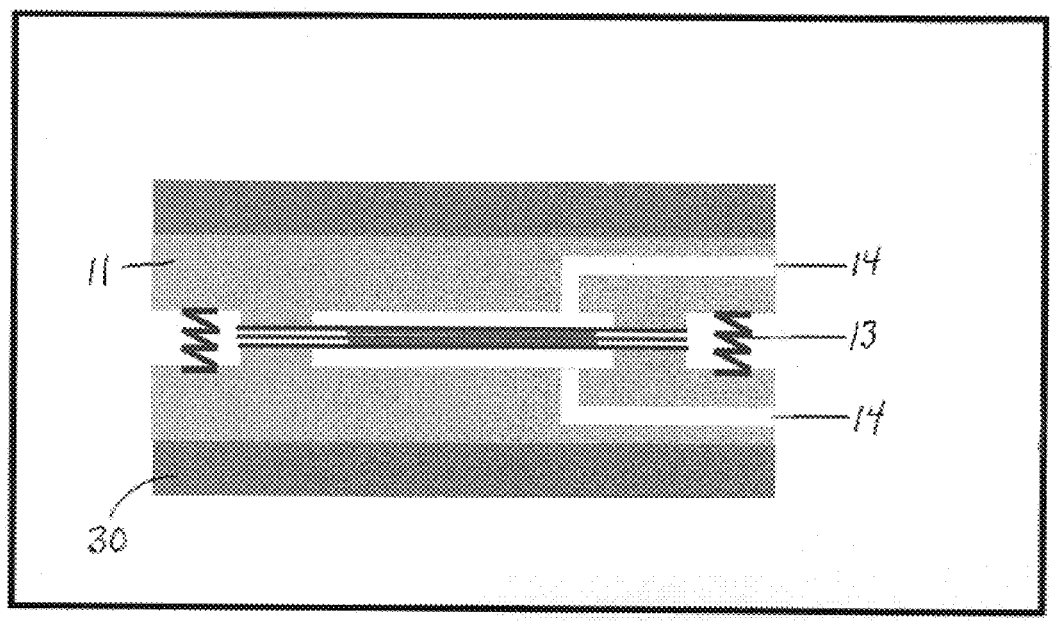
FIG. 4 is a cross section of the tool during the laminate edge sealing and consolidation cycles.

When cavity 19 is closed, tool 10 is in its closed position shown in FIG. 4. The cavity 19 is then pressurized, defined as the Lamination Pressure Application (LPA), with a medium, either gas or fluid, defined as the Lamination Pressure Media (LPM), there results a pressure application to both surfaces of the lamination structure 20.

The LPA is accomplished by the LPM entering into one or more ports or inlet pressure openings 14, discussed above. The one or more inlet pressure openings 14 are controlled in series or in parallel. The inlet pressure openings 14 can allow for the passage of gas, in one embodiment, or fluid, in another embodiment.

The Lamination Pressure Media (LPM) may be any gas or fluid capable of transferring pressure to the surfaces of the laminate structure 20. Examples of LPM that are gases include nitrogen, argon, air, and helium. Examples of fluids include polymer melts or heat transfer oils. The LPM can optionally be a medium having a chemical interaction with the surface of the lamination structure 20, to impart greater adhesion to the surfaces of the laminate structure 20. An example of an LPM having a chemical reaction with the surface of lamination structure 20 may be one or more chemically reactive gases. Chemically reactive gases include air, oxygen or oxygen blended gases. Other LPM can shield the lamination surfaces from environmental degradation (such as oxidation) during processing, by using LPM that are inert gases, such as nitrogen, argon or helium gas. A development model of the tool 10 of the present disclosure used nitrogen gas as the LPM, with two ports or inlet pressure passages 14.

In this disclosure, the interior of the cavity is pressurized by the Lamination Pressure Medium to a pressure of at least 200 Pounds per square inch, and may be pressurized to higher pressures of at least 1000 pounds per square inch.

Figure 3:
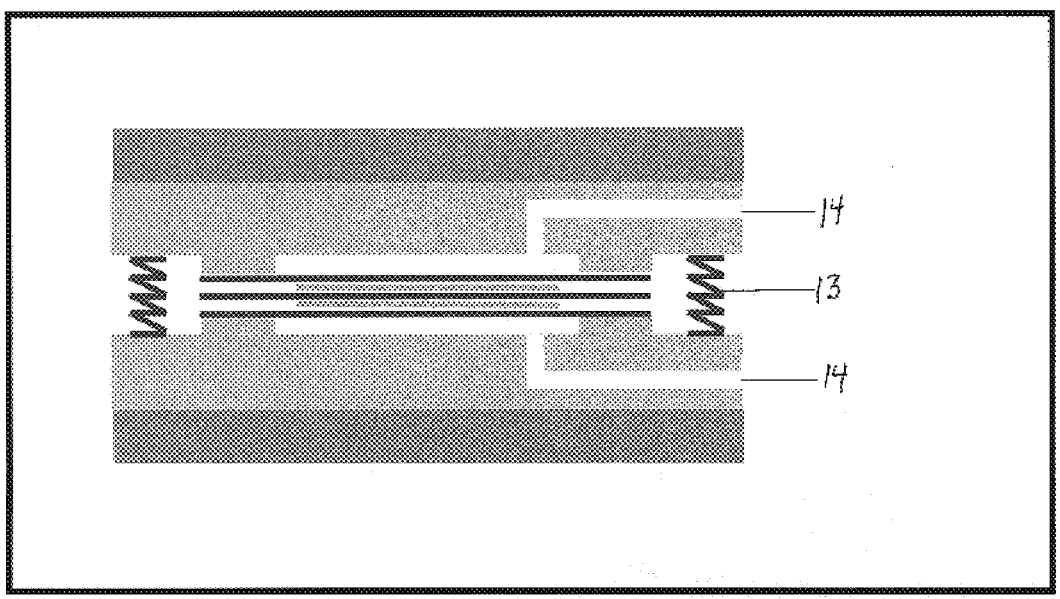
FIG. 3 is a cross section of the tool with the laminate structure therein.

The tool 10 of the present disclosure is designed to use heat and vacuum to remove moisture from the polymer film 25 as well as to evacuate air, so there is no air trapped during the lamination process. FIG. 3 illustrates the tool 10 of the present disclosure during the laminate evacuation and drying segment. The applied vacuum is about 28 inches of mercury, and the pressure is low enough for the springs 13 to keep the tool 10 open. Temperatures above 200° F. are generally used for removal of moisture. Again, a VHP may be used to provide controlled heating, vacuum and sealing pressure.

The cavity 19 of the tool 10 of the present disclosure may readily be heated to a temperature of at least 600° F. The cavity 19 can achieve temperatures of at least 700° F. or even 1000° F., which may be necessary to laminate certain polyimide films.

FIG. 4 illustrates the tool 10 of the present disclosure where the VHP applies pressure to the pair of platens 11, compressing the springs 13 so that the two or more springs are compressed and opposing sealing surfaces 12 are pressed together, to close cavity 19 around the lamination structure 20. The VHP 30 applies pressure to platens 11 to compact the laminate edge. Nitrogen gas was used as the LPM in a development model of the tool 10, but any LPM described above may be used. The vacuum is generally about 28 inches of mercury, but could be reduced. The pressures used in this step are high enough to ensure the edges of the laminate structure will remain sealed during pressurization of the cavity 19. The cavity 19 thus formed is pressurized with a LPM that is supplied from an external source, so as to consolidate the lamination of the metal foil 23 to the polymer film 25. The pressure needed to consolidate the lamination is the consolidation pressure. The consolidation pressure and temperature are dependent on the materials that are being laminated.

During the lamination cooling phase of the process, the lamination structure 20 is isolated from the tooling edge by the contraction isolator 27, preventing laminate distortion. Cooling is provided by the VHP, in which the cooling rates, pressure profiles and vacuum profiles are dependent on the characteristics of the materials that are being laminated.

The present disclosure includes a tool for laminating a metal foil and a polymer to form a laminate structure comprising: a body having two or more platens, each one of the two or more platens having a sealing surface, wherein the two or more platens and the sealing surface of each platen form a cavity; a means for moving the two or more platens towards or away from each other to open and close the cavity; wherein the cavity has an interior that is pressurized and heated to form the laminate structure; and wherein the cavity is evacuated and heated to remove volatiles from the laminate structure.

The tool further comprises two or more springs. The two or more springs are positioned between the two or more platens to keep the platens separated when not subjected to pressure from the moving means.

The moving means disclosed herein can be a vacuum hydraulic press (VHP), or other hydraulically-actuated mechanism. The means for evacuating the cavity can be a mechanical vacuum pump, such as would be used on a VHP. Heat may be applied using integral electrical or heat transfer fluid heating.

The tool 10 of the present disclosure offers the advantage that a LPM, such as an inert gas, is used to apply hydrostatic pressure evenly to a lamination surface, resulting in high quality laminate structures useful for heater fabrication. In addition, the tool 10 easily achieves the high temperatures (as great as 1000° F.) and pressures (as great as 3000 psi) that permit fabrication of laminate structures using polymer films 25, such as polyimide films. The rapidity at which high pressures and high temperatures can be applied minimize the degradation of thin polyimide films 25 and metal foils 23 that may occur when the lamination materials are kept for extended times at temperatures greater than 600° F.

The tool 10 of the present disclosure offers economic and environmental benefits, in that the tool does not require the costly expendable polymer seals, sealants or thermoplastic films that are used in autoclaves, nor the costly expendable bagging film and breather fabric or mats.

Another benefit of the tool 10 of the present disclosure requires dramatically less volumes of the LPM (such as nitrogen gas) to pressurize the cavity for lamination as compared with an autoclave, also reducing costs and environmental impact. The volume of LPM needed to be pressurized is only that amount needed to fill the open cavity 19, which is a much smaller quantity than when using an autoclave. For example, the open cavity 19 in this tool 10 may be about 10 mils thick. When the cavity is closed, only the small amount of an LPM (such as nitrogen gas) needed to fill that closed cavity needs to be pressurized. By contrast, the open space within an autoclave may be 3 feet by 10 feet or larger, and requires a far larger volume of pressurized gas. In addition, many of the disposables associated with an autoclave, such as polymer seals, sealants, thermoplastic films) are eliminated by use of this tool 10. Thus, there are both economic and environmental benefits to the tool 10 as disclosed herein.

The tool 10 of the present disclosure is well suited for design configurations that permit simultaneous fabrication of multiple parts. In addition, the tool 10 is well suited for design as a self-contained manufacturing cell that can integrate the actuation and application of heat, pressure and vacuum, which is easily incorporated into a single piece flow production facility.

Although the embodiments illustrated in the drawings show the tool 10 used to manufacture one laminate structure 20 at a time, the tool could be configured so as to make several laminate structures at the same time. Such embodiments of the tool 10 would be created with more than one cavity 29, such as by placing another platen, with ports, in the center of the open cavity. Alternatively, the tool 10 could be configured as a multi-cavity tool, so that several laminate structures could be created at one time simply by stacking the platens 11 and placing more laminate structures 20 inside the formed cavities 19.

Alternative embodiments of the tool 10 of the present disclosure include substitution of a flat plate for one of the pair of platens, resulting in application of pressure on the surface of the lamination structure 20 from only one side. Another alternative embodiment, the tool 10 would have an open cavity that is contoured or curved to accommodate various geometries of lamination structure 20. Still another alternative embodiment, the tool 10 would have multiple cavities stacked to increase the number of laminate structures 20 that can be simultaneously fabricated. Also, the tooling surfaces themselves could be integrally heated and cooled.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A tool for laminating a metal foil and a polymer to form a laminate structure comprising:
   a body having two or more platens, each one of the two or more platens having a sealing surface, wherein the two or more platens and the sealing surface of each platen form a cavity, and wherein the sealing surface of each platen is configured to compact edges of a laminate structure to be formed within the cavity, the laminate structure comprising at least one foil layer and one film layer;

a moving mechanism to move the two or more platens towards or away from each other to open and close the cavity;

wherein the cavity has an interior that is pressurized and heated to form the laminate structure; and wherein the cavity is evacuated and heated to remove volatiles from the laminate structure.

2. The tool according to claim 1, further comprising two or more springs.

3. The tool according to claim 2, wherein the two or more springs are positioned between the two or more platens to keep the platens separated when not subjected to pressure from the moving means.

4. The tool according to claim 1, wherein the moving mechanism is a Vacuum Hydraulic Press (VHP) or other hydraulically actuated mechanism.

5. The tool according to claim 1, wherein the cavity is evacuated by a mechanical vacuum pump.

6. The tool according to claim 1, wherein an interior of the cavity is pressurized by a lamination pressure medium.

7. The tool according to claim 6, wherein the interior of the cavity is pressurized by the lamination pressure medium to a pressure of at least 200 pounds per square inch.

8. The tool according to claim 6, wherein the interior of the cavity is pressurized by the lamination pressure medium to a pressure of at least 1000 pounds per square inch.

9. The tool according to claim 6, wherein the lamination pressure medium is one or more inert gases.

10. The tool according to claim 9, wherein the one or more inert gases is nitrogen, argon or helium gas.

11. The tool according to claim 6, wherein the lamination pressure medium is one or more chemically reactive gases.

12. The tool according to claim 11, wherein the one or more chemically reactive gases is air, oxygen, or oxygen blended gases.

13. The tool according to claim 6, wherein the interior of the cavity is pressurized by the lamination pressure medium flowing through one or more inlet ports.

14. The tool according to claim 13, wherein the one or more inlet ports are controlled in series or in parallel.

15. The tool according to claim 1, wherein the interior of the cavity is heated to a temperature of at least 600° F.

16. The tool according to claim 1, wherein the interior of the cavity is heated to a temperature of at least 700° F.

17. The tool according to claim 1, wherein the cavity is pressurized and heated by applying externally supplied pressure and heat from a vacuum hydraulic press or autoclave.

18. The tool according to claim 1, wherein the cavity is evacuated and heated by applying an externally supplied vacuum and heating using integral electrical or heat transfer fluid heating.

19. The tool according to claim 1, wherein each of the two or more sealing surfaces are flat surfaces.

20. The tool according to claim 1, wherein each of the two or more sealing surfaces are non-flat surfaces.

21. The tool according to claim 1, wherein the laminate structure to be formed within the cavity is comprised of a pair of opposing outer surfaces, and wherein the two or more platens comprise at least a first platen having a first sealing surface and a second platen having a second sealing surface, and wherein the first sealing surface is to engage one of the pair of opposing outer surfaces and the second sealing surface is to engage the other of the pair of opposing outer surfaces such that a seal is created at the edges of the laminate structure when the moving mechanism presses the first and second platens together at a sealing pressure.

22. The tool according to claim 1, wherein the laminate structure to be formed within the cavity is comprised of a pair of opposing outer surfaces with at least one of the pair of opposing outer surfaces being spaced apart from an interior platen surface in the cavity when the tool is closed, and wherein the cavity is pressurized by a lamination pressure medium such that the lamination pressure medium is directly applied against the at least one of the pair of opposing outer surfaces of the laminate structure.

23. The tool according to claim 22, wherein both opposing outer surfaces are spaced apart from interior platen surfaces when the tool is closed, and wherein the lamination pressure medium is directly applied against both of the opposing outer surfaces.

24. The tool according to claim 23 wherein the at least one film layer comprises at least one polymer film layer and wherein the at least one foil layer comprises a first layer of metal foil on one side of the polymer layer and a second layer of metal foil on an opposite side of the polymer layer, and wherein the laminate structure includes a first contraction isolator removably secured to an outer surface of the first layer of metal foil and a second contraction isolator removably secured to an outer surface of the second layer of metal foil.

25. The tool according to claim 1, including a plurality of springs reacting between at least two of the two or more platens and biased to keep the platens separated when not subjected to pressure from the moving mechanism, wherein the springs are positioned circumferentially outward of the sealing surfaces.

* * * * *

UNITED STATES PATENT AND TRADEMARK OFFICE
CERTIFICATE OF CORRECTION

PATENT NO. : 7,658,217 B2 Page 1 of 1
APPLICATION NO. : 11/646732
DATED : February 9, 2010
INVENTOR(S) : Vontell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 379 days.

Signed and Sealed this

Twenty-eighth Day of December, 2010

David J. Kappos
*Director of the United States Patent and Trademark Office*